US012696328B2

(12) United States Patent
Li et al.

(10) Patent No.: US 12,696,328 B2
(45) Date of Patent: Jul. 28, 2026

(54) METHOD, MOBILE TERMINAL AND STORAGE MEDIUM FOR TRANSFERRING WIFI ADDRESS

(71) Applicant: TCL COMMUNICATION (NINGBO) CO., LTD., Ningbo (CN)

(72) Inventors: Jinhan Li, Ningbo (CN); Donghai Wu, Ningbo (CN); Shaohua Liu, Ningbo (CN); Jin Yan, Ningbo (CN); Zhangfeng Zou, Ningbo (CN)

(73) Assignee: TCL COMMUNICATION (NINGBO) CO., LTD., Ningbo (CN)

( * ) Notice: Subject to any disclaimer, the term of this patent is extended or adjusted under 35 U.S.C. 154(b) by 303 days.

(21) Appl. No.: 18/507,122

(22) Filed: Nov. 13, 2023

(65) Prior Publication Data

US 2024/0080917 A1 Mar. 7, 2024

Related U.S. Application Data

(63) Continuation of application No. PCT/CN2022/077300, filed on Feb. 22, 2022.

(30) Foreign Application Priority Data

May 20, 2021 (CN) .......................... 202110555398.5

(51) Int. Cl.
*H04W 8/26* (2009.01)
*H04W 76/10* (2018.01)

(52) U.S. Cl.
CPC ............. *H04W 76/10* (2018.02); *H04W 8/26* (2013.01)

(58) Field of Classification Search
CPC ....... H04W 76/10; H04W 8/26; H04W 8/005; H04W 84/12; H04W 4/80; H04W 76/14; H04W 84/18
See application file for complete search history.

(56) References Cited

U.S. PATENT DOCUMENTS

| | | | |
|---|---|---|---|
| 9,319,828 B2 | 4/2016 | Decuir et al. | |
| 9,743,225 B2 * | 8/2017 | Lee | H04W 4/80 |
| 2014/0308898 A1 * | 10/2014 | Lee | H04W 4/80 |
| | | | 455/41.3 |
| 2016/0050203 A1 * | 2/2016 | Hefetz | H04L 51/18 |
| | | | 726/7 |

(Continued)

FOREIGN PATENT DOCUMENTS

| | | | |
|---|---|---|---|
| CN | 103188280 A | 7/2013 | |
| CN | 107222835 A * | 9/2017 | H04L 63/12 |

(Continued)

OTHER PUBLICATIONS

International Search Report in International application No. PCT/CN2022/077300,mailed on Apr. 27, 2022.

(Continued)

*Primary Examiner* — Lakeram Jangbahadur
(74) *Attorney, Agent, or Firm* — PV IP PC; Wei Te Chung

(57) ABSTRACT

A method, a mobile terminal and a storage medium for transferring a WiFi address. The method includes acquiring a Bluetooth address of a target device; establishing a Bluetooth connection with the target device to obtain a Bluetooth connection status according to the Bluetooth address; transferring the WiFi address to the target device according to the Bluetooth connection status.

14 Claims, 3 Drawing Sheets

(56)               References Cited

U.S. PATENT DOCUMENTS

2020/0104081 A1 *  4/2020  Miyake ............. G06K 7/10722

FOREIGN PATENT DOCUMENTS

| CN | 107864469 A | 3/2018 | |
|----|-------------|--------|---|
| CN | 111800768 A | 10/2020 | |
| CN | 112040504 A | 12/2020 | |
| CN | 113316130 A | 8/2021 | |
| WO | WO-2018077084 A1 * | 5/2018 | ......... H04L 41/0806 |

OTHER PUBLICATIONS

Written Opinion of the International Search Authority in International application No. PCT/CN2022/077300,mailed on Apr. 27, 2022.
Chinese Office Action issued in corresponding Chinese Patent Application No. 202110555398.5 dated Apr. 1, 2022, pp. 1-6.
European Search Report in European application No. 22803588.7,mailed on Apr. 10, 2025.

* cited by examiner

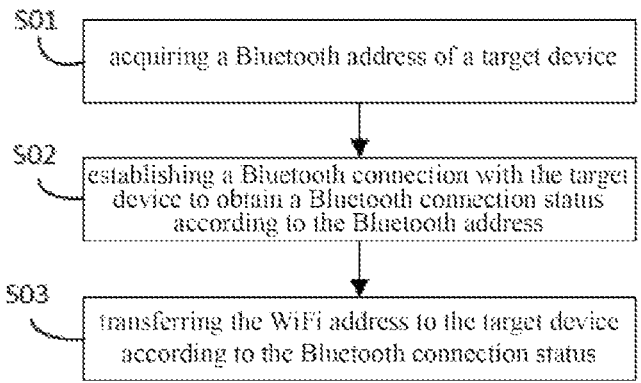

S01 acquiring a Bluetooth address of a target device

S02 establishing a Bluetooth connection with the target device to obtain a Bluetooth connection status according to the Bluetooth address S03 transferring the WiFi address to the target device according to the Bluetooth connection status

FIG. 1

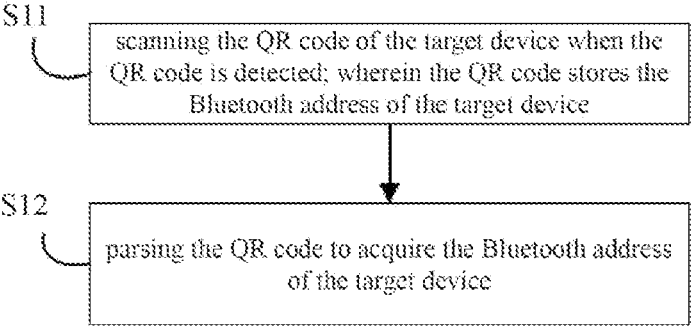

S11 scanning the QR code of the target device when the QR code is detected; wherein the QR code stores the Bluetooth address of the target device S12 parsing the QR code to acquire the Bluetooth address of the target device

FIG. 2

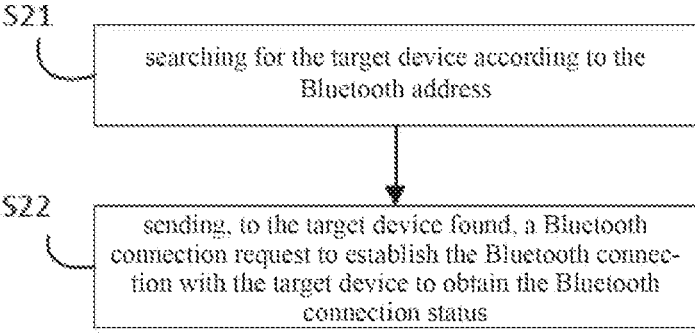

S21 searching for the target device according to the Bluetooth address

S22 sending, to the target device found, a Bluetooth connection request to establish the Bluetooth connection with the target device to obtain the Bluetooth connection status

FIG. 3

S31 — identifying the Bluetooth connection status

S32 — if the Bluetooth connection status is connected, sending the WiFi address to the target device through a Bluetooth channel Bluetooth address acquisition module — 10

Bluetooth connection module — 20

WiFi address transfer module — 30

METHOD, MOBILE TERMINAL AND STORAGE MEDIUM FOR TRANSFERRING WIFI ADDRESS

CROSS-REFERENCE TO RELATED APPLICATIONS

This application is a continuation application of International Application No. PCT/CN2022/077300, filed on Feb. 22, 2022, which claims priority to Chinese patent application No. 202110555398.5, filed on May 20, 2021 and entitled "WIFI ADDRESS TRANSMISSION METHOD AND APPARATUS, MOBILE TERMINAL, AND STORAGE MEDIUM", both of which are incorporated herein by reference in their entirety.

TECHNICAL FIELD

The present disclosure relates to the field of data transmission technology, and in particular to a method, an apparatus, a mobile terminal and a storage medium for transferring a WiFi address.

BACKGROUND

In screen projection applications, projecting a screen of a mobile phone to a personal computer (PC) is an important application scenario. The operating system of personal computers is generally Windows operating system. In Microsoft's open universal Application Programming Interfaces (APIs) for Windows system, there is only an API for connecting to a group owner device (Group Owner, abbreviated as GO), but no API for creating a Group. That is, the personal computer can only act as a Client in WiFi P2P connections. Only the mobile phone can create a Group and act as the GO, while the personal computer actively connects to the mobile phone.

SUMMARY

If a personal computer wants to actively connect to a mobile phone, the Windows universal API requires that a WiFi address of the peer (mobile phone and other terminals) has to be used. That is, if a WiFi P2P connection is to be established between the mobile phone and the personal computer, the personal computer has to know the WiFi address of the mobile phone.

Therefore, it is necessary to provide a method, an apparatus, a mobile terminal and a storage medium for transferring a WiFi address to solve the aforementioned problem.

In a first aspect, the present disclosure provides a method for transferring a WiFi address, which includes acquiring a Bluetooth address of a target device; establishing a Bluetooth connection with the target device to obtain a Bluetooth connection status according to the Bluetooth address; and transferring the WiFi address to the target device according to the Bluetooth connection status.

In a second aspect, the present disclosure provides a mobile terminal, which includes a memory, a processor, and a Bluetooth technology-based WiFi address transfer program that is stored in the memory and operable on the processor. The processor, when executing the Bluetooth technology-based WiFi address transfer program, implementing instructions including acquiring a Bluetooth address of a target device; establishing a Bluetooth connection with the target device to obtain a Bluetooth connection status according to the Bluetooth address; and transferring the WiFi address to the target device according to the Bluetooth connection status.

In a third aspect, the present disclosure provides a computer-readable storage medium, the computer-readable storage medium having stored thereon a Bluetooth technology-based WiFi address transfer program. The Bluetooth technology-based WiFi address transfer program, when executed by a processor, implements steps including acquiring a Bluetooth address of a target device; establishing a Bluetooth connection with the target device to obtain a Bluetooth connection status according to the Bluetooth address; and transferring the WiFi address to the target device according to the Bluetooth connection status.

The method for transferring a WiFi address as provided by the present disclosure implements the transfer of a WiFi address by acquiring a Bluetooth address of a target device, then establishing a Bluetooth connection between a terminal device and the target device according to the Bluetooth address, and finally transferring the WiFi address of the terminal device to the target device through the Bluetooth connection, thus enabling the target device to accurately obtain the WiFi address of the terminal device, which in turn enables the target device to actively initiate a WiFi P2P connection to the terminal device according to the WiFi address, providing convenience for the target device. Transferring the WiFi address through Bluetooth technology also makes it easier to establish a WiFi P2P connection between the target device and the terminal device, providing convenience for the user.

Further embodiments of the present disclosure can also achieve other advantageous technical effects not listed in detail. These other technical effects may be partially described thereinafter, and can be expected and understood by those skilled in the art after reading the present disclosure. The Summary is intended to introduce concepts and options that will be further described below in the "Detailed Description of the Invention" in a simplified form to help readers understand the present disclosure more easily. This Summary is not intended to identify key features or essential features of the claimed subject matter, nor is it intended to be used to limit the scope of the claimed subject matter. All of the foregoing features are to be understood to be merely exemplary, and additional features and purposes may be gleaned from the present disclosure with respect to the structures and methods. A more comprehensive demonstration of the features, details, utility, and advantages of the present disclosure will be provided in the following written description of various embodiments of the present disclosure, illustrated in the accompanying drawings, and defined in the appended claims. Accordingly, many restrictive interpretations of the contents of the present disclosure cannot be understood without further reading of the entire specification as well as the claims and accompanying drawings.

BRIEF DESCRIPTION OF THE DRAWINGS

FIG. 1 is a flow chart illustrating specific steps of the method for transferring a WiFi address as provided by the present disclosure;

FIG. 2 is a flow chart illustrating specific steps of Step S01 shown in FIG. 1;

FIG. 3 is a flow chart illustrating specific steps of Step S02 shown in FIG. 1;

DETAILED DESCRIPTION

Figure 4:
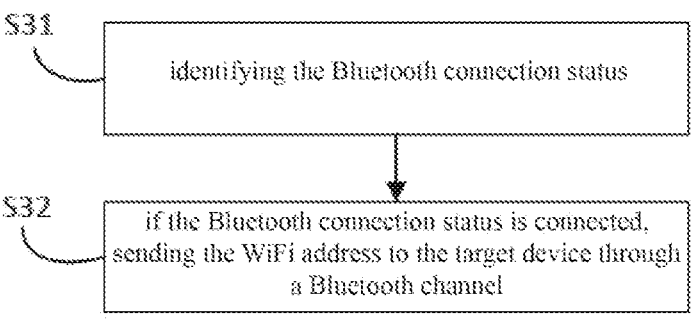
FIG. 4 is a flow chart illustrating specific steps of Step S03 shown in FIG. 1.

In order to make the purpose, technical solutions and advantages of the present disclosure clearer and more explicit, the present disclosure will be further described in detail below with reference to the accompanying drawings and by way of embodiments. It should be understood that the specific embodiments described herein are only used to explain the present disclosure and are not intended to limit the present disclosure.

Those skilled in the art will understand that unless otherwise stated, the singular forms "a", "an", "said" and "the" used herein may also include plural forms. It should be further understood that the word "comprising/including" used in the specification of the present disclosure refers to the presence of said features, integers, steps, operations, elements and/or components, but does not exclude the presence or addition of one or more other features, integers, steps, operations, elements, components and/or groups thereof. It will be understood that when an element is referred to as being "connected" or "coupled" to another element, it can be directly connected or coupled to the other element, or intervening elements may also be present. In addition, "connected" or "coupled" as used herein may include wireless connection or wireless coupling. The expression "and/or" used herein includes all or any units and all combinations of one or more associated listed items.

In the description of the embodiments of the present disclosure, it should be noted that the terms "center", "up", "down", "left", "right", "vertical", "horizontal", "inside", "outside" and the like indicate orientation or positional relationships based on those shown in the accompanying drawings, and are intended only for ease of the description of the embodiments of the present disclosure and for simplification of the description, and do not indicate or suggest that the means or elements referred to must have a specific orientation, be constructed and operated in a specific orientation, and therefore are not to be construed as limiting the embodiments of the present disclosure. In addition, the terms "first", "second", and "third" are used for descriptive purposes only, and should not be construed as indicating or implying relative importance.

In the description of the embodiments of the present disclosure, it should be noted that unless otherwise specified and defined, the terms "installation", "connection", and "link" should be understood in a broad sense. For example, there may be a fixed connection, a removable connection, or an integral connection; there may be a mechanical connection or an electrical connection; there may be a direct connection or an indirect connection through an intermediate medium, or there may be an internal connection between two elements. Those of ordinary skills in the art can understand the specific meanings of the above terms in the embodiments of the present disclosure in specific situations.

Nowadays, screen projection applications are prevalent. The data bearer of many screen projection applications is WiFi P2P connection, and the WiFi P2P connection is the basis of screen projection applications. WiFi devices can work on either the 5G frequency band or the 2.4G frequency band, and have a higher data rate when working on the 5G frequency band than that on the 2.4G frequency band. WiFi P2P technology, also known as Wi-Fi Direct, is a member of the WiFi technology family. The Wi-Fi Direct standard allows devices in a wireless network to connect to each other without a router. This standard allows wireless devices to be interconnected via a peer-to-peer mode and provides a significant increase in transmission speed and distance over Bluetooth. In the P2P connection, the device has two roles: GO and Client. GO is the abbreviation of Group Owner, which means the owner of a group, and Client is the user end. It can be simply understood that GO is a master device and Client is a slave device. When performing P2P operations, GO and Client form a Group. Groups are divided into two types, i.e., Persist Groups and Temporary Groups. In a Persist Group, a designated device acts as the GO. And once security configuration information and Group-related information are generated, they will not be changed subsequently. In subsequent use, the information can be directly utilized, which greatly reduces the connection time. In a Temporary Group, the assignment of roles to Go and Client is determined by the Group Formation and is the result of negotiation between the two devices. The information of the Temporary Group is temporary. It has to be created temporarily for each subsequent use, and the connection time is longer than that of the Persist Group.

In screen projection applications, projecting a screen of a mobile phone to a PC (i.e., personal computer) is an important application scenario. The operating system of PCs is generally Windows operating system. In Microsoft's open universal APIs (i.e., Application Program Interfaces) for Windows, there is only an API for connecting to a GO device, but no API for creating a Group. That is, the PC can only act as a Client in WiFi P2P connections. Only the mobile phone can create a Group and act as the GO, while the PC actively connects to the mobile phone. If a PC wants to actively connect to a mobile phone, the Windows universal API requires that a WiFi address of the peer (mobile phone and other terminals) has to be used. Thus, if a WiFi P2P connection is to be established between the mobile phone and the PC, the PC has to know the WiFi address of the mobile phone. Therefore, the present disclosure provides a method, an apparatus, a mobile terminal and a storage medium for transferring a WiFi address to solve the aforementioned problem.

The method for transferring a WiFi address as provided by the present disclosure includes:

acquiring a Bluetooth address of a target device;

establishing, according to the Bluetooth address, a Bluetooth connection with the target device to obtain a Bluetooth connection status;

transferring, according to the Bluetooth connection status, the WiFi address to the target device.

The method for transferring a WiFi address as provided by the present disclosure implements the transfer of a WiFi address by acquiring a Bluetooth address of a target device, then establishing a Bluetooth connection between a terminal device and the target device according to the Bluetooth address, and finally transferring the WiFi address of the terminal device to the target device through the Bluetooth connection, thus enabling the target device to accurately obtain the WiFi address of the terminal device, which in turn enables other operations, such as implementing a WiFi P2P connection.

Exemplary Methods

The present disclosure will be described in more detail below with reference to a number of specific embodiments of the present disclosure in conjunction with the accompanying drawings. It is to be noted that the embodiments and the features in the embodiments in the present application may be combined with each other without conflict.

Figure 5:
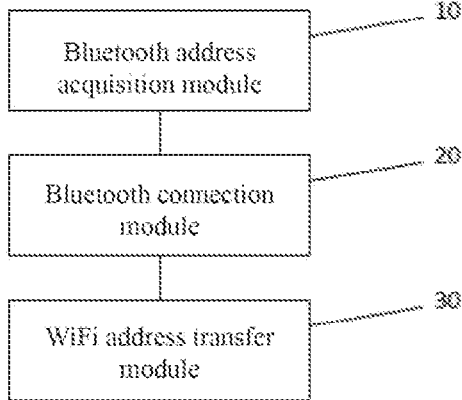
FIG. 5 is a structural block diagram of the apparatus for transferring a WiFi address as provided by the present disclosure.
Figure 6:
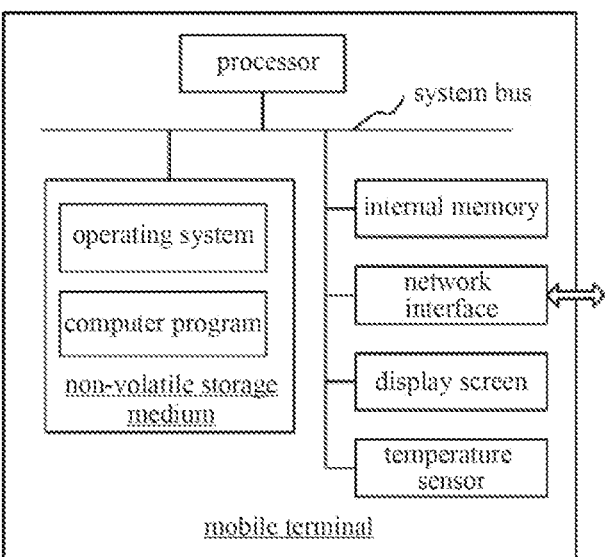
FIG. 6 is a structural block diagram of the mobile terminal provided by the present disclosure.

Please also refer to FIGS. 1-6. FIG. 1 is a flow chart illustrating specific steps of the method for transferring a WiFi address as provided by the present disclosure; FIG. 2 is a flow chart illustrating specific steps of Step S01 shown in FIG. 1; FIG. 3 is a flow chart illustrating specific steps of Step S02 shown in FIG. 1; FIG. 4 is a flow chart illustrating specific steps of Step S03 shown in FIG. 1; FIG. 5 is a structural block diagram of the apparatus for transferring a WiFi address as provided by the present disclosure; and FIG. 6 is a structural block diagram of the mobile terminal provided by the present disclosure.

Please refer to FIG. 1. FIG. 1 is a flow chart illustrating specific steps of the method for transferring a WiFi address as provided by the present disclosure. The method for transferring a WiFi address in the present embodiment may include the following specific steps: Step S01, Step S02, and Step S03.

At Step S01: Acquire a Bluetooth address of a target device.

In the present embodiment, what this embodiment seeks to solve is the problem of how the target device acquires the WiFi address of the terminal device. The present embodiment acquires the WiFi address through Bluetooth SPP technology. The SPP protocol (SPP is the abbreviation of Serial Port Profile, and the SPP protocol refers to the serial port profile) is often employed in Bluetooth technology. Bluetooth serial port is a device based on the SPP protocol and capable of creating serial ports for data transmission between Bluetooth devices. The SPP protocol can establish between two Bluetooth-enabled devices a virtual serial port through which the two Bluetooth-enabled devices can perform data communication.

In the SPP protocol, Bluetooth devices are divided into Server end and Client end. In SPP applications, the Server end waits for connection by other Bluetooth devices, and the Client end has to actively connect to the Server device. When the Client end is to connect to the Server end, the Client end needs to acquire a Bluetooth address of the Server end. In this embodiment, the target device serves as the Server end, and the terminal device serves as the Client end. Therefore, in the present embodiment, it is necessary to acquire the Bluetooth address of the target device first. The terminal device acquires the Bluetooth address of the target device before a Bluetooth SPP connection can be made.

In a specific implementation, Step S01 acquires the Bluetooth address of the target device through QR code technology. Please refer to FIG. 2 for details, and Step S01 specifically includes the following steps: Step S11 and Step S12.

At Step S11: Scan, when a QR code is detected, the QR code of the target device; where the QR code stores the Bluetooth address of the target device;

At Step S12: Parse the QR code to acquire the Bluetooth address of the target device.

In the present embodiment, the Bluetooth address of the target device is transferred by generating a QR code. QR code, also known as two-dimensional barcode, is a relatively prevalent coding method in recent years. Compared with traditional barcode, QR code can store more information. Now there are many development tools that can easily generate QR code. A QR code is a black and white graphic that records data symbol information and is distributed on a plane (in two-dimensional directions) in some specific geometric pattern according to certain rules. The QR code tactfully utilizes the concept of '0' and '1' bit streams that forms the basis of computer internal logic in code compilation, uses several geometric shapes corresponding to binary system to represent text information, and is automatically read through image input devices or photoelectric scanning devices to achieve automatic information processing.

In the present embodiment, the target device generates a QR code from its Bluetooth address information, and the terminal device scans and recognizes the QR code, such that the Bluetooth address can be quickly transferred between the target device and the terminal device, thus improving the speed of establishment of the Bluetooth SPP connection. In addition, QR code technology also has the characteristics of strong error tolerance and high decoding reliability. The decoding error rate of QR code is lower than two parts per million of that of the ordinary barcode, and the decoding error rate of QR code is no more than one part per ten million. Therefore, in the present embodiment, the QR code technology is employed to transfer the Bluetooth address.

At Step S02: Establish, according to the Bluetooth address, a Bluetooth connection with the target device to obtain a Bluetooth connection status.

In a specific implementation, please refer to FIG. 3 in detail, the Step S02 specifically includes the following steps: Step S21 and Step S22.

At Step S21: Search for the target device according to the Bluetooth address;

At Step S22: Send, to the target device found, a Bluetooth connection request to establish the Bluetooth connection with the target device.

In some implementations, in the specific implementation process of Step S02, the target device first creates an SPP server, and as a Server end in the SPP profile, it shall remain switched on and wait for connection before the Bluetooth SPP connection is made. The terminal device needs to acquire the Bluetooth address of the target device, and search for and connect to the target device according to the acquired Bluetooth address. When the terminal device finds the target device, the terminal device sends a Bluetooth SPP connection request to the target device. After the target device receiving and parsing the Bluetooth SPP connection request sent by the terminal device, a Bluetooth SPP connection between the target device and the terminal device is established. In the present embodiment, by virtue of the target device creating the Bluetooth SPP server in advance and remaining switched on as the Server end in the SPP profile, after the terminal device acquires the Bluetooth address of the target device, the target device is enabled to remain switched on for the terminal device to search for and connect to, which helps to speed up the establishment of Bluetooth SPP connection. In some implementations, the terminal device sends its WiFi address to the target device through the Bluetooth SPP connection, and the target device can perform other operations after acquiring the WiFi address of the terminal device, such as performing a WiFi P2P connection.

In the present embodiment, Step S21 also includes the following steps:

Searching, according to the Bluetooth address, for the target device in the surroundings within a preset period;

Reacquiring, if searching for the target device within the preset period fails, the Bluetooth address, and searching, according to the reacquired Bluetooth address, for the target device until the target device is found.

That is to say, when the terminal device fails to find the target device within the preset period, it needs to return to Step S01 and restart the steps of transferring the WiFi address.

In addition, Step S21 also includes: saving, according to a Bluetooth search result, the target device found. In the present embodiment, the target device found is saved, such that the terminal devices can connect to the same target device again later.

At Step S03: Transfer, according to the Bluetooth connection status, the WiFi address to the target device.

Specifically, please refer to FIG. 4. Step S03 also includes: Step S31 and Step S32.

At Step S31: Determine the Bluetooth connection status;

At Step S32: Send, if the Bluetooth connection status is determined to be connected, the WiFi address to the target device through a Bluetooth channel.

In the present embodiment, the Bluetooth connection status is determined first, and when the Bluetooth connection status is determined to be connected, the WiFi address of the terminal device can be directly sent, thus implementing the transfer of the WiFi address.

Preferably, in the present embodiment, the target device is a personal computer, and the terminal device is a mobile phone. Therefore, in the present embodiment, the acquisition process of the WiFi between the personal computer and the mobile phone can be simply summarized as follows: the personal computer creates a Bluetooth SPP server, and before a Bluetooth SPP connection is made, the personal computer remains switched on and waits for the connection; the personal computer generates a QR code using its Bluetooth address; the mobile phone scans the QR code to obtain the Bluetooth address of the personal computer, and initiates a Bluetooth SPP connection request to the personal computer according to the Bluetooth address; the personal computer that remains switched on receives the Bluetooth SPP connection request and establishes the Bluetooth SPP connection; the mobile phone sends its WiFi address to the personal computer through the Bluetooth SPP connection, thus implementing the acquisition of the WiFi address of the mobile phone.

Generally, the target device initiates a WiFi scan first before it is to establish a WiFi P2P connection with the terminal device. When the terminal device is scanned, the WiFi P2P connection is to be initiated. If the target device can quickly manage a WiFi scan of the terminal device, user experience will be greatly improved. Therefore, in the present embodiment, the target device directly acquires the WiFi address of the terminal device and performs a single WiFi scan, which enables a fast scan of the terminal device, thus greatly improving user experience.

It should be noted that the operating system of personal computers is generally Windows operating system and in Microsoft's open APIs for Windows system, there is only an API for connecting to a GO device. The personal computer can only act as a Client in WiFi P2P connections. Only the mobile phone can create a Group and act as the GO, while the personal computer actively connects to the mobile phone. If a personal computer wants to actively connect to a mobile phone, the personal computer has to know the WiFi address of the mobile phone. Therefore, in the present embodiment, the target device is a personal computer and the terminal device is a mobile phone. In the present embodiment, after the personal computer acquires the WiFi password/address of the mobile phone, the personal computer can act as a Client in the WiFi P2P connection. By virtue of creating a Group through the mobile phone, the mobile phone acting as a GO, and the personal computer actively connecting to the mobile phone, a WiFi P2P connection between the personal computer and the mobile phone is established, thus facilitating data transmission between the two, enabling a fast scan to the mobile phone, and greatly improving user experience.

Exemplary Apparatus

As shown in FIG. 5, FIG. 5 is a structural block diagram of an apparatus for transferring a WiFi address as provided by the present disclosure. The present disclosure also provides an apparatus for transferring a WiFi address. The apparatus includes a Bluetooth address acquisition module 10, a Bluetooth connection module 20 and a WiFi address transfer module 30. Specifically, the Bluetooth address acquisition module 10 is configured to acquire a Bluetooth address of a target device. The Bluetooth connection module 20 is configured to establish a Bluetooth connection with the target device to obtain a Bluetooth connection status according to the Bluetooth address. The WiFi address transfer module 30 is configured to transfer the WiFi address to the target device according to the Bluetooth connection status.

In one implementation, the Bluetooth address acquisition module 10 further includes a QR code recognition unit, which is configured to recognize a QR code generated from Bluetooth address information of the target device. Specifically, the target device generates the QR code from its Bluetooth address information, and the terminal device scans and recognizes the QR code through the QR code recognition unit, such that the Bluetooth address can be quickly transferred between the target device and the terminal device, thus improving the speed of establishment of the Bluetooth SPP connection.

Based on the above embodiments, the present disclosure also provides a mobile terminal, the functional block diagram of which is shown in FIG. 6. The mobile terminal includes a processor, a memory, a network interface, a display screen, and a temperature sensor connected through a system bus. Wherein, the processor of the mobile terminal is configured to provide computational and control capabilities. The memory of the mobile terminal includes a non-volatile storage medium and an internal memory. The non-volatile storage medium stores an operating system and computer program. The internal memory provides an environment for running of the operating system and computer programs in the non-volatile storage medium. The network interface of the mobile terminal is configured to communicate with external terminals through network connections. The computer program when executed by the processor implements a method for transmitting a WiFi address. The display screen of the mobile terminal may be a liquid crystal display screen or an electronic ink display screen. The temperature sensor of the mobile terminal is pre-installed inside the mobile terminal for detecting the operating temperature of the internal equipment.

Those skilled in the art can understand that the functional block diagram shown in FIG. 6 is only a block diagram of part of the structure related to the solution of the present disclosure, and does not constitute a limitation on the mobile terminal to which the solution of the present disclosure is applied. The specific mobile terminal Terminals may include more or fewer components than shown in the figures, or may combine certain components, or may have a different arrangement of components.

In one embodiment, a mobile terminal is provided. The mobile terminal includes a memory, a processor, and a WiFi address transfer program stored in the memory and operable on the processor. The processor when executing the WiFi address transfer program implements the following instructions:

acquiring a Bluetooth address of a target device;

establishing, according to the Bluetooth address, a Bluetooth connection with the target device to obtain a Bluetooth connection status;

transferring, according to the Bluetooth connection status, the WiFi address to the target device.

In some embodiments, the processor when executing the WiFi address transfer program implements the following specific instructions:

triggering the target device to generate a QR code from the Bluetooth address of the target device for scanning by the terminal device;

parsing the QR code to acquire the Bluetooth address of the target device being transferred to the terminal device;

triggering the target device to create a Bluetooth SPP server and to remain switched on as the Server side in the SPP profile waiting for connection;

sending a Bluetooth SPP connection request to the target device for establishing a Bluetooth SPP connection between the target device and the terminal device;

triggering the target device to acquire the WiFi address of the terminal device according to the established Bluetooth SPP connection.

Those of ordinary skill in the art can understand that all or part of the processes in the methods of the above embodiments can be completed by instructing relevant hardware through a computer program. The computer program can be stored in a non-volatile computer-readable storage medium. The computer program when executed may include the processes of the embodiments of the above methods. Any reference to memory, storage, database or other media used in the various embodiments provided by the present disclosure may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRS-DRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM), etc.

In summary, the method for transferring a WiFi address as provided by the present disclosure implements the acquisition of the WiFi address by establishing a Bluetooth SPP connection between the target device and the terminal device, sending the WiFi address of the terminal device to the target device using the Bluetooth SPP connection, thus enabling the target device to obtain the WiFi address of the terminal device, which in turn enables the target device to actively connect to the terminal device, providing convenience for the target device. Acquiring the WiFi address through Bluetooth technology also makes it more convenient to establish a WiFi P2P connection between the target device and the terminal device, providing convenience for users. Transferring the Bluetooth addresses through QR code technology facilitates speeding up the establishment of the Bluetooth SPP connection. By virtue of the Bluetooth SPP server being created in advance by the target device and remaining switched on, the terminal device can acquire the Bluetooth address of the target device before searching for and connecting to the target device, which facilitates speeding up the establishment of the Bluetooth SPP connection. By combining the use of QR code technology and Bluetooth SPP technology, the present disclosure enables the target device to quickly and accurately acquire the WiFi address of the terminal device, which facilitates the target device to actively search for the terminal device and establish a WiFi P2P data transmission channel in the WiFi P2P connection, providing better user experiences.

Unless otherwise stated, it should be understood that terms such as "processing", "computing", "calculating", "identifying" and the like refer to actions and/or processes of a computer or computing system, or similar electronic computing device. The computing system or similar electronic computing device manipulates and/or converts data represented as physical (e.g., electronic) quantities within the computing system's registers and/or memory, converts such data into other data similarly represented as physical quantities within a computing system memory or register or other such information memory, transmission or mobile terminal. In this context, the embodiments are not limited. The term "coupled" may be used herein to refer to any type of relationship, direct or indirect, between the components under discussion, and may apply to electrical, mechanical, fluid, optical, electromagnetic, electromechanical, or other connections. In addition, the terms "first", "second", etc. are used herein only to facilitate discussion, and have no specific temporal or chronological meaning unless otherwise stated.

Finally, it should be noted that: for those skilled in the art, it is obvious that the present application is not limited to the details of the above-mentioned exemplary embodiments, and that the present application can be implemented in other specific forms without departing from the spirit or basic features of the present application. Therefore, the embodiments should be regarded as exemplary and non-restrictive from any point of view, and the scope of the present application is defined by the appended claims rather than by the above description, and it is therefore intended that all changes that fall within the meaning and scope of equivalent elements of the claims are included in the present application. Any reference sign in a claim should not be construed as limiting the claim concerned. In addition, it is obvious that the word "comprising/including" does not exclude other elements or steps, and the singular forms do not exclude the plural forms. The plurality of units or devices stated in the system claims may also be implemented by one unit or device through software or hardware. Words such as first, second, etc. are used to denote names and do not denote any particular order. The application of the present disclosure is not limited to the above-described examples, and it is still possible to modify the technical solutions recited in the aforementioned embodiments or to make equivalent substitutions for some of the technical features therein; and these modifications or substitutions do not cause the essence of the corresponding technical solutions to depart from the spirit and scope of the technical solutions of the various embodiments of the present disclosure. Those skilled in the art will understand from the preceding description that a wide range of techniques for implementing the various embodiments of the present disclosure can be implemented in various forms. Thus, although the various embodiments of the present disclosure are described in connection with their particular examples, the true scope of the various embodiments of the present disclosure should not be limited in this way, as other modifications will become apparent to the skilled practitioner after studying the accompanying drawings, the specification, and the appended claims.

What is claimed is:

1. A method perform by a mobile terminal for transferring a WiFi address, wherein the method comprises following steps:

acquiring a Bluetooth address of a target device;

establishing, according to the Bluetooth address, a Bluetooth connection with the target device;

transferring, according to the Bluetooth connection status, the WiFi address to the target device;

wherein said establishing according to the Bluetooth address the Bluetooth connection with the target device to obtain the Bluetooth connection status comprises:

searching, according to the Bluetooth address, for the target device;

sending, to the target device found, a Bluetooth connection request to establish the Bluetooth connection with the target device to obtain the Bluetooth connection status;

wherein said sending to the target device found the Bluetooth connection request to establish the Bluetooth connection with the target device comprises:

triggering the target device to set a device status to waiting for Bluetooth connection; and sending, to the target device found, the Bluetooth connection request to establish the Bluetooth connection with the target device;

wherein said triggering the target device to set the device status to waiting for Bluetooth connection comprises:

triggering the target device to set the device status to waiting for Bluetooth connection before establishing the Bluetooth connection.

2. The method for transferring a WiFi address according to claim 1, wherein said acquiring the Bluetooth address of the target device comprises:

acquiring the Bluetooth address of the target device through a Quick Response (QR) code.

3. The method for transferring a WiFi address according to claim 2, wherein said acquiring the Bluetooth address of the target device through the QR code comprises:

scanning, when the QR code is detected, the QR code of the target device; wherein the QR code stores the Bluetooth address of the target device;

parsing the QR code to acquire the Bluetooth address of the target device.

4. The method for transferring a WiFi address according to claim 1, wherein said searching according to the Bluetooth address for the target device further comprises:

searching, according to the Bluetooth addresses, for the target device within a preset period;

reacquiring, if searching for the target device within the preset period fails, the Bluetooth address, and searching, according to the reacquired Bluetooth address, for the target device until the target device is found.

5. The method for transferring a WiFi address according to claim 1, wherein said searching according to the Bluetooth address for the target device further comprises:

saving, according to a Bluetooth search result, the target device found.

6. The method for transferring a WiFi address according to claim 1, wherein said transferring according to the Bluetooth connection status the WiFi address to the target device comprises:

determining the Bluetooth connection status;

sending, if the Bluetooth connection status is determined to be connected, the WiFi address to the target device through a Bluetooth channel.

7. A mobile terminal, wherein the mobile terminal comprises:

a memory, a processor, and a Bluetooth technology-based WiFi address transfer program that is stored in the memory and operable on the processor, and the processor, when executing the Bluetooth technology-based WiFi address transfer program, implementing following instructions:

acquiring a Bluetooth address of a target device;

establishing, according to the Bluetooth address, a Bluetooth connection with the target device; and transferring, according to the Bluetooth connection status, the WiFi address to the target device;

wherein said establishing the Bluetooth connection with the target device to obtain the Bluetooth connection status according to the Bluetooth address comprises:

searching, according to the Bluetooth address, for the target device;

sending, to the target device found, a Bluetooth connection request to establish the Bluetooth connection with the target device to obtain the Bluetooth connection status;

wherein said sending to the target device found the Bluetooth connection request to establish the Bluetooth connection with the target device comprises:

triggering the target device to set a device status to waiting for Bluetooth connection;

sending, to the target device found, the Bluetooth connection request to establish the Bluetooth connection with the target device;

wherein said triggering the target device to set the device status to waiting for Bluetooth connection comprises:

triggering the target device to set the device status to waiting for Bluetooth connection before establishing the Bluetooth connection.

8. The mobile terminal according to claim 7, wherein said acquiring a Bluetooth address of a target device further comprises:

recognizing a Quick Response (QR) code generated from the Bluetooth address of the target device.

9. The mobile terminal according to claim 7, wherein said acquiring the Bluetooth address of the target device comprises:

acquiring the Bluetooth address of the target device through a Quick Response (QR) code.

10. The mobile terminal according to claim 9, wherein said acquiring the Bluetooth address of the target device through the QR code comprises:

scanning, when the QR code is detected, the QR code of the target device; wherein the QR code stores the Bluetooth address of the target device;

parsing the QR code to acquire the Bluetooth address of the target device.

11. The mobile terminal according to claim 7, wherein said searching for the target device according to the Bluetooth address further comprises:

searching, according to the Bluetooth addresses, for the target device within a preset period;

requiring, if searching for the target device within the preset period fails, the Bluetooth address, and searching, according to the reacquired Bluetooth address, for the target device until the target device is found.

12. The mobile terminal according to claim 7, wherein said searching for the target device according to the Bluetooth address further comprises:

saving, according to a Bluetooth search result, the target device found.

13. The mobile terminal according to claim 7, wherein said transferring the WiFi address to the target device according to the Bluetooth connection status comprises:

identifying the Bluetooth connection status;

sending, if the Bluetooth connection status is connected, the WiFi address to the target device through a Bluetooth channel.

14. A non-transitory computer-readable storage medium, wherein the computer-readable storage medium having stored thereon a Bluetooth technology-based WiFi address transfer program, the WiFi address transfer program, when executed by a processor, implementing following steps:

acquiring a Bluetooth address of a target device;

establishing, according to the Bluetooth address, a Bluetooth connection with the target device;

transferring, according to the Bluetooth connection status, the WiFi address to the target device;

wherein said establishing according to the Bluetooth address the Bluetooth connection with the target device to obtain the Bluetooth connection status comprises:

searching, according to the Bluetooth address, for the target device;

sending, to the target device found, a Bluetooth connection request to establish the Bluetooth connection with the target device to obtain the Bluetooth connection status;

wherein said sending to the target device found the Bluetooth connection request to establish the Bluetooth connection with the target device comprises:

triggering the target device to set a device status to waiting for Bluetooth connection; and sending, to the target device found, the Bluetooth connection request to establish the Bluetooth connection with the target device;

wherein said triggering the target device to set the device status to waiting for Bluetooth connection comprises:

triggering the target device to set the device status to waiting for Bluetooth connection before establishing the Bluetooth connection.

* * * * *